Patented Oct. 21, 1930

1,779,047

UNITED STATES PATENT OFFICE

KURT RIPPER, OF VIENNA, AUSTRIA, ASSIGNOR TO THE FIRM KUNSTHARZFABRIK DR. FRITZ POLLAK GESELLSCHAFT M. B. H., OF VIENNA, AUSTRIA

POROUS HOMOGENEOUS CLOUDY ARTIFICIAL COMPOSITIONS AND PROCESSES FOR THEIR MANUFACTURE

No Drawing. Application filed November 8, 1926, Serial No. 147,191, and in Austria November 14, 1925.

The processes hitherto known for the manufacture of condensation products by the action of aldehydes, particularly formaldehyde, on urea or derivatives of urea aim primarily at the production of crystal clear, water bright, vitreous artificial composition. The same initial materials afford however, the possibility of producing cloudy products of an opalescent to chalk white appearance. If these cloudy compositions have also a porous structure imparted to them, products resembling meerschaum can be obtained.

The processes hitherto suggested for this purpose are carried out in such a way that they permit the reaction between urea and formaldehyde to proceed under such chemical conditions that a white product is formed from the very commencement in the mixed solution. The resin solution which is rendered cloudy or milk-like by this white product is then converted into a coarsely porous cloudy product by whisking it up and allowing it to solidify rapidly. These hitherto known processes have the disadvantage that they depend upon the observance of certain chemical conditions in the initial solution. Furthermore the porous texture of such compositions is irregular owing to the rough mechanical manner of its production, and blister-like excrescences are exhibited.

The object of the present invention therefore, is to provide a process by the aid of which, independently of the raw materials, cloudy and perfectly homogenous porous compositions with a determinable size of pore can be produced. It has been found that this can be done in a surprisingly simple manner if the initial condensation product is first prepared in the usual manner, the porous structure being afterwards produced merely by colloidal chemical action of the subsequent gelatinizing process, the interstitial spaces between the pores approximating to the order of magnitude of the wave length of light, or exceeding it, after which hardening is effected and the porous structure maintained.

It is known, that the process for the production of condensation products of urea takes place in general in three stages. The first stage yields a more or less viscous condensation product of the character of a sol. In the second stage gelatinization takes place and in the third stage the mass is hardened by the expulsion of the dispersion medium still contained in the jelly.

By the aid of this invention it is now possible through the colloidal chemical action of the gelatinizing process taking place in the second stage, to vary the density of the gelatinous material produced, as may be desired. To influence the gelatinizing process any means known to colloidal chemistry for this purpose may be used. As however, the colloids do not behave uniformly for the various influencing methods which may be employed, the most favourable means should be selected according to the particular condensation product provided by the first stage and according to the degree of cloudiness and the size of pores desired. Further considerations to this end, such as the use of definite concentrations, certain temperatures, and the addition of suitable colloidal chemically active substances are also involved.

Whereas for example in the manufacture of glass clear artificial masses or compositions the tendency was to expel the dispersion medium as completely as possible prior to gelatinization according to this invention compositions rich in dispersion medium are allowed to gelatinize, so that a jelly with a less dense texture is produced, in which pores of suitable size are produced by the subsequent removal of the dispersion medium.

In order to prevent the jellies rich in the dispersion medium from compacting together again during subsequent hardening, the resin composition rich in the dispersion medium is preferably hardened simultaneously with gelatinization to such a degree that the jelly produced will have imparted to it the desired porous structure during the final hardening by the expulsion of the water or other dispersion medium, and will suffer no appreciable amount of shrinkage. This hardening may be effected by the action of added substances which have a coagulating effect or by the use of a higher gelatinizing temperature, or by the joint use of these two means.

In this way it is possible to so increase the interstitial spaces (which in the glass clear compositions can scarcely be perceived even with the best artificial aid and are far below 0.3 $\mu$) that the composition loses its glass clear transparency. The pores thus formed are not visible to the naked eye, as their order of magnitude lies approximately between 0.4 $\mu$ and 4$\mu$. If the size of the pores reaches that of the wave length of light the product obtained appears opalescent. If the size of the pores be still further increased, the product appears cloudy to a still greater degree, until finally, when the size of the pores exceeds 1$\mu$, it assumes a snow white appearance. The size of the pores is adjustable arbitrarily by means of the present process.

The process yields a great number of different artificial compositions, which can all be used as materials for turning. As the pores contained in them are not visible externally, the materials can be highly polished. They partially resemble meerschaum and partially formaldehyde casein compounds and even opal.

Examples of the ways in which this invention may be carried out are as given below:

1. According to the process described in the specification of British Patent No. 213,567 a hydrophile condensation product is produced from 75 parts by weight of carbamide and 200 parts by weight of formaldehyde said product comprising about 275 parts by weight. As described in the specification of British Patent No. 193,420, so much of a formaldehyde fixing medium is then added as corresponds to the free formaldehyde present and then one part of concentrated formic acid is added. After thoroughly mixing, the condensation product which contains 300 grammes of carbamide in 1000 cubic centimetres it is allowed to stand for some time at ordinary room temperature so that the bubbles may rise, after which the mass is brought to a temperature of 40 degrees C. After from 8 to 10 hours the originally water clear and perfectly bubble free solution will be found to have solidified to a milky jelly the cloudiness of which continues to increase. After from 1 to 2 days the white jelly is removed from the mould, if necessary cut up and afterwards hardened under such conditions that collapse of the loose gelatinous structure cannot take place. This hardening may be effected for example by keeping the jelly in a cool place (at a temperature below 30 degrees C.) until it has given up the greater part of the water. In this way the jelly acquires the necessary strength to prevent any collapse of the particles on rise of temperature, or as the case may be to avoid any clarifying at any portions that may collapse. A snow-white meerschaum-like composition is obtained.

2. Instead of the gelatinization and hardening of the resin composition obtained from 75 parts by weight of carbamide and 200 parts by weight of formaldehyde as in Example 1 by the addition of one part by weight of concentrated formic acid at 40 degrees C., the same quantity and volume of resin composition may be gelatinized and hardened by the addition of 0.1 part by weight of formic acid at 70 degrees C. After from one to two days the snow white jelly is removed from the mould and further treated as in Example 1.

3. If 10 per cent of water be expelled from the 275 parts by weight of the liquid condensation product in vacuo (whereby the concentration of the resin is so raised that in about 1000 cubic centimetres of the resin there are present 375 grammes of carbamide) and if the gelatinization and hardening be carried out exactly as in Example 1 or 2, slightly denser materials are obtained which however, do not possess the perfect white cloudiness of the products obtainable according to Example 1.

If still more liquid be distilled off so that the concentration is still further raised, completely homogenous opalescent products are obtained.

4. Instead of commencing with a hydrophile condensation product, hydrophobe condensation products produced from urea and formaldehyde according to the process described in the specifications of British Patent No. 213,567 or British application 4,598/26 may be employed. In this case the resin composition must have a certain amount of dispersion medium added to it prior to its gelatinization. For this purpose 100 parts by weight of hydrophobe resin are mixed with 30 parts by weight of alcohol. After adding 0.5 parts by weight of phosphoric acid the mass is intimately mixed, poured into a mould and allowed to gelatinize at 50 degrees C. After standing for 24 hours at this temperature the jelly is removed from the mould and allowed to stand by itself at a temperature not exceeding 20 degrees C. After the main portion of the alcohol and water have been driven off the mass can be hardened finally at any desired temperature.

All these compositions may have incorporated with them during their manufacture or, owing to their porosity, even after manufacture, all kinds of organic or inorganic materials liquid, solid, dense or fibrous which are capable of suitably affecting the quality of the final product.

Instead of acids, any substances which will assist gelatinization such for example as acid salts, ammonium salts, neutral salts of powerful acids with powerful bases, albumen precipitating agents and the like may be added to the resin or produced in the mass.

The products of the present process possess according to the degree of white cloudiness which corresponds to their porous structure, a smaller or larger apparent specific gravity which lies between 0.5 to 1.2. The artificial compositions so obtained can be mechanically worked in a most excellent manner, that is to say they can be filed, bored, milled and polished. Owing to their porous structure they possess a great power of taking up both liquids and gases.

What I claim is:

1. The process for the preparation of homogeneous porous meerschaum-like artificial bodies with regular size of pores, which comprises producing solutions with carbamide and aldehydes of the type of formaldehyde and which further comprises diluting the condensation solution so as to contain a large proportion of a dispersion medium, the amount of diluent being less than would be necessary to prevent gelatinization bringing the bubble-free dispersion-medium-rich solution so obtained to gelatinization at not substantially above 50° C., with the inclusion of the dispersion medium present and permitting the jelly to so far harden in the presence of most of the dispersion medium that upon the subsequent elimination of the dispersion medium by the application of elevated temperature until the said dispersion medium is completely volatilized, no diminution of the volume of the mass takes place, and uniform porosity of the mass is produced.

2. Process according to claim 1 characterized in this that gelatinizing agents, of the group consisting of acids and acid producing substances, are added to the dispersion-medium-rich condensation solution, in such a small amount that no flocculation of the condensation product from the solution takes place.

3. Modification of the process according to claim 1 characterized in this that in the driving out of the dispersion medium from the solidified jelly, the latter at first so long heated at temperatures under 30° C., until the principal quantity of water is given off, whereupon the further hardening takes place at a higher temperature.

In testimony whereof I have affixed my signature.

KURT RIPPER.